United States Patent
Zhang et al.

(10) Patent No.: US 11,588,781 B2
(45) Date of Patent: Feb. 21, 2023

(54) CONTROLLING NETWORK TRAFFIC PERTAINING TO A DOMAIN NAME BASED ON A DNS-IP MAPPING

(71) Applicant: HEWLETT PACKARD ENTERPRISE DEVELOPMENT LP, Houston, TX (US)

(72) Inventors: Haifeng Zhang, Beijing (CN); Hao Lu, Santa Clara, CA (US); Mohan Ram Bhadravati Ramakrishna Bhat, Bangalore (IN); Xiaoding Shang, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 23 days.

(21) Appl. No.: 17/242,551

(22) Filed: Apr. 28, 2021

(65) Prior Publication Data
US 2022/0353235 A1     Nov. 3, 2022

(51) Int. Cl.
*H04L 61/4511* (2022.01)
*H04L 61/2514* (2022.01)
(Continued)

(52) U.S. Cl.
CPC .......... *H04L 61/4511* (2022.05); *H04L 45/74* (2013.01); *H04L 45/76* (2022.05);
(Continued)

(58) Field of Classification Search
CPC ............ H04L 61/4511; H04L 61/2514; H04L 61/5076; H04L 45/00; H04L 45/74;
(Continued)

(56) References Cited

U.S. PATENT DOCUMENTS 7,725,602 B2   5/2010  Liu et al.
9,210,122 B2   12/2015 Batz et al.
(Continued)

FOREIGN PATENT DOCUMENTS

CN        106657321 A     5/2017

OTHER PUBLICATIONS

E. T. Fioreze and G. Heijenk, "Extending the Domain Name System (DNS) to provide geographical addressing towards vehicular ad-hoc networks (VANETs)," 2011 IEEE Vehicular Networking Conference (VNC), 2011, pp. 70-77. (Year: 2011).*
(Continued)

*Primary Examiner* — Joshua Kading
(74) *Attorney, Agent, or Firm* — Mauriel Kapouytian; Woods LLP

(57) ABSTRACT

Some examples relate to controlling network traffic pertaining to a domain name based on a Domain Name System-Internet Protocol address (DNS-IP) mapping. An example includes receiving, in a cloud computing system, a local DNS-IP mapping for a domain name from respective Access Points (APs) in a virtual local area network (VLAN) along with geographical information of respective APs; generating a global DNS-IP mapping database comprising the local DNS-IP mapping for the domain name received from
(Continued)

respective APs in the VLAN along with geographical information of respective APs, in the cloud computing system; and determining appropriate APs to distribute the global DNS-IP mapping, based on location information of respective APs.

20 Claims, 6 Drawing Sheets

(51) Int. Cl.
*H04L 61/5076* (2022.01)
*H04L 9/40* (2022.01)
*H04W 4/029* (2018.01)
*H04L 12/46* (2006.01)
*H04L 65/102* (2022.01)
*H04L 47/24* (2022.01)
*H04L 45/76* (2022.01)
*H04L 45/74* (2022.01)
*H04W 8/26* (2009.01)

(52) U.S. Cl.
CPC .......... *H04L 47/24* (2013.01); *H04L 61/2514* (2013.01); *H04L 61/5076* (2022.05); *H04L 63/101* (2013.01); *H04W 8/26* (2013.01); *H04L 12/4641* (2013.01); *H04L 65/102* (2013.01); *H04W 4/029* (2018.02)

(58) Field of Classification Search
CPC ..... H04L 45/76; H04L 47/24; H04L 63/0236; H04L 63/0272; H04L 63/101; H04L 12/4641; H04L 12/66; H04L 65/102; H04L 9/40; H04W 8/26; H04W 4/029
See application file for complete search history.

(56) References Cited

U.S. PATENT DOCUMENTS

| | | | |
|---|---|---|---|
| 2003/0216140 A1* | 11/2003 | Chambert | H04L 61/00 455/422.1 |
| 2011/0093522 A1* | 4/2011 | Chen | H04L 67/1021 709/227 |
| 2014/0149601 A1* | 5/2014 | Carney | H04L 67/52 709/238 |
| 2017/0134337 A1* | 5/2017 | Araújo | H04L 61/4511 |
| 2020/0274848 A1 | 8/2020 | Sundararajan et al. | |
| 2021/0099532 A1* | 4/2021 | Goel | H04L 67/1001 |
| 2021/0152513 A1* | 5/2021 | Grayson | H04L 69/326 |
| 2021/0168127 A1* | 6/2021 | Jensen | H04L 9/3263 |
| 2021/0176301 A1* | 6/2021 | Mutnuru | H04L 43/10 |

OTHER PUBLICATIONS

F. Q. Lin, J. Xie, Z. Shen and X. Xu, "DR3: Optimizing Site Selection for Global Load Balance in Application Delivery Controller," 2012 7th Open Cirrus Summit, 2012, pp. 11-15. (Year: 2012).*

Cisco, "Configuring an FQDN ACL," Security Configuration Guide: Access Control Lists, Cisco IOS XE Release 3E, retrieved online Mar. 19, 2021 at https://www.cisco.com/c/en/us/td/docs/ios-xml/ios/sec_data_acl/configuration/xe-3e/sec-data-acl-xe-3e-book/sec-cfg-fqdn-acl.pdf.

* cited by examiner

CONTROLLING NETWORK TRAFFIC PERTAINING TO A DOMAIN NAME BASED ON A DNS-IP MAPPING

BACKGROUND

The Domain Name System (DNS) is a naming database in which internet domain names are translated into numerical Internet Protocol (IP) addresses. It is a hierarchical naming system for computers or other resources connected to the Internet. Its purpose is to provide a layer of abstraction between Internet services (e.g., email) and the numeric IP addresses used to uniquely identify any given resource on the Internet. Simply stated, the DNS converts a name typed in a Web browser's address bar into an IP address.

BRIEF DESCRIPTION OF THE DRAWINGS

For a better understanding of the solution, examples will now be described, with reference to the accompanying drawings, in which.

DETAILED DESCRIPTION

Figure 1:
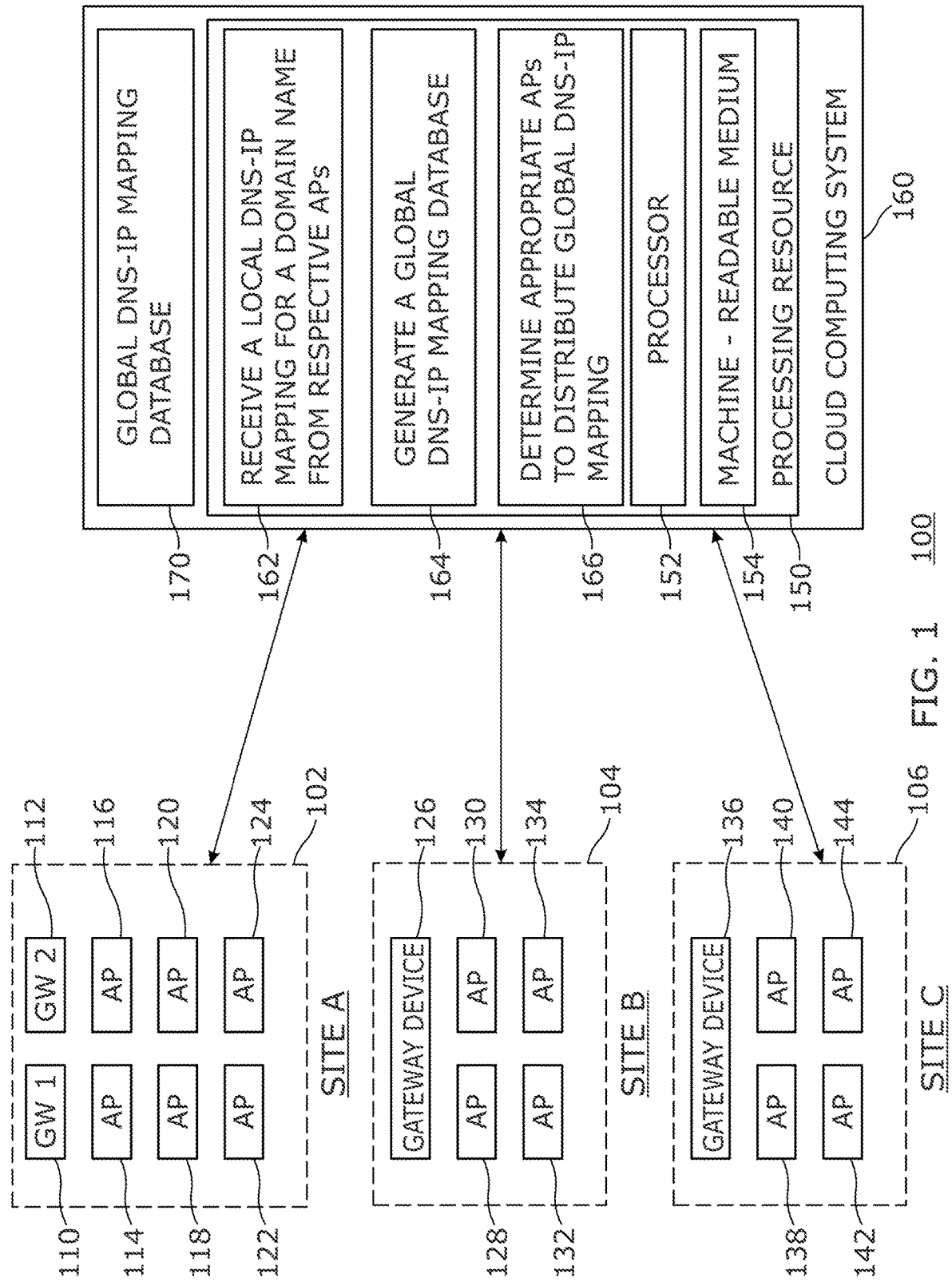
FIG. 1 is a block diagram of an example computing environment for controlling network traffic pertaining to a domain name based on a DNS-IP mapping.

Network administrators may control network access to a domain name (e.g., xyz.com) for various reasons such as network security, network bandwidth management, safeguarding enterprise data, etc. Domain-based Access Control List (ACL) and Policy-based Routing (PBR) may allow a network administrator to apply policies to network traffic based on domain names. This may be useful since sometimes configuring IP addresses within an ACL or a PBR policy may not be easy and straightforward. For example, in an Internet Access Provider (IAP) network, if a network administrator wants to use ACL to block user traffic to a domain (e.g., xyz.com), the administrator may need to include all possible IP addresses in the ACL. This could be difficult. Since a domain name may use multiple servers to handle incoming requests, it may be challenging to put all IP addresses within an ACL. A domain based ACL may be useful, since an AOL could be configured to deny any xyz.com traffic in the network.

However, there are technological challenges with applying policies to network traffic in domain-based ACL during roaming (i.e. when a client device roams). In most cases, a client may cache the DNS result for a certain period. In the above example, if the client roams from one AP to a new AP and tries to access same domain "xyz.com", it may directly use the cached IP address to contact "xyz.com" without initiating any new DNS transaction on the new AP, since the new AP was not involved in the initial DNS transaction and may not know that this IP address is for "xyz.com". Thus, the client device may still be able to access "xyz.com" upon roaming. This is not a desirable scenario from a network administrator's perspective who may wish to control network access to a domain name (e.g., xyz.com) for reasons mentioned earlier.

Examples disclosed herein address these technological issues by controlling network traffic pertaining to a domain name based on a Domain Name System-Internet Protocol address (DNS-IP) mapping. Local DNS-IP mapping from individual APs in a virtual Local Area Network (VLAN) are sent to a cloud computing system, which collates the individual local DNS-IP mapping information to generate a global DNS-IP mapping. The global DNS-IP mapping is distributed to appropriate APs at a site, which enables recipient APs to control network traffic pertaining to the domain name, for example, via an ACL or a PBR.

Examples disclosed herein addresses the aforementioned roaming issue with domain-based ACL. They do not require a new DNS transaction on an AP after roaming, since the AP already may have access to the global DNS-IP mapping from a cloud computing system. Thus, upon roaming, the AP may directly enforce a domain-based ACL without any new DNS transaction.

In some examples, a method is provided that includes receiving, in a cloud computing system, a local DNS-IP mapping for a domain name from respective APs in a VLAN along with geographical information of respective APs. The local DNS-IP mapping comprises a list of IP addresses used for the domain name. Upon receipt of the local DNS-IP mapping for the domain name from respective APs in the VLAN, a global DNS-IP mapping database is generated in the cloud computing system. Instructions then determine appropriate APs to distribute the global DNS-IP mapping, based on location information of respective APs. The global DNS-IP mapping may allow recipient APs to control network traffic pertaining to the domain name.

In some examples, a system is to receive a local DNS-IP mapping for a domain name from respective APs in a VLAN along with geographical information of respective APs. The local DNS-IP mapping may comprise a list of IP addresses used for the domain name. The system is to generate a global DNS-IP mapping database comprising the local DNS-IP mapping for the domain name received from respective APs in the VLAN along with geographical information of respective APs, in a cloud computing system. The system is to determine appropriate APs to distribute the global DNS-IP mapping, based on location information of respective APs.

In some examples, a non-transitory machine-readable storage medium includes instructions to receive a local DNS-IP mapping for a domain name from respective APs in a VLAN along with geographical information of respective APs. The local DNS-IP mapping may comprise a list of IP addresses used for the domain name. The instructions to generate a global DNS-IP mapping database comprising the local DNS-IP mapping for the domain name received from respective APs in the VLAN along with geographical information of respective APs, in a cloud computing system. The instructions to determine appropriate APs to distribute the global DNS-IP mapping, based on location information of respective APs.

Referring now to the figures, FIG. 1 is a block diagram of an example computing environment 100 for controlling network traffic pertaining to a domain name based on a DNS-IP mapping.

In an example, computing environment 100 may include a first computer network 102, a second computer network 104, a third computer network 106, and a cloud computing system 160. In an example, first computer network 102, second computer network 104, and third computer network 106 may each represent a first virtual local area network (VLAN) 102, a second VLAN 104, and a third VLAN 106, respectively.

In an example, first VLAN 102 may include gateway devices 110 and 112, and APs 114, 116, 118, 120, 122, and 124; second VLAN 104 may include a gateway device 126 and APs 128, 130, 132, and 134; and third VLAN 106 may include a gateway device 136 and APs 138, 140, 142, and 144. As used herein, the term "Access Point" (AP) refers to an element in a network that provides access to the network infrastructure. The term "Access Point" may include a gateway device. As used herein, a "gateway device" refers to a network device that provides a remote network with connectivity to a host network.

In an example, first VLAN 102, second VLAN 104, and third VLAN 106 may each be present at different sites, for example, site A, site B, and site C, respectively. As used herein, the term "site" refers to a pre-defined physical space in a geographical area. Some examples of a "site" may include a floor of a building, a building, a campus, etc.

Although three VLANs are shown in FIG. 1, in other examples of this disclosure, computing environment 100 may include more or fewer than three VLANs, and each of the VLANs may include more or fewer than the number of gateway devices and APs depicted in the example computing environment of FIG. 1.

Each of the three VLANs may be communicatively coupled to cloud computing system 160, for example, via a computer network. The computer network may be a wireless or wired network. The computer network may include, for example, a Wide Area Network (WAN), a Metropolitan Area Network (MAN), a Storage Area Network (SAN), a Campus Area Network (CAN), or the like. Further, the computer network may be a public network (for example, the Internet) or a private network.

As used herein, the term "cloud computing system" (or "cloud") refers to an on-demand network access to a shared pod of information technology resources (e.g., networks, servers, storage, and/or applications) that can be quickly provisioned. Cloud computing system 160 may include a public cloud system, a private cloud system, or a hybrid cloud system. Cloud computing system 160 may be used to provide or deploy various types of cloud services. These may include Infrastructure as a Service (IaaS), Platform as a Service (PaaS), Software as a Service (SaaS), and so forth.

In an example, cloud computing system 160 may include a processing resource 150. Examples of processing resource 150 may include a computing device, a server, a desktop computer, a smartphone, a laptop, a network device, dedicated hardware, a virtualized device, or the like.

In an example, processing resource 150 may include a processor 152 and a machine-readable storage medium 154 communicatively coupled through a system bus. Processor 152 may be any type of Central Processing Unit (CPU), microprocessor, or processing logic that interprets and executes machine-readable instructions stored in machine-readable storage medium 154. Machine-readable storage medium 154 may be a random access memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable medium.

In some examples, machine-readable storage medium 154 may store machine-readable instructions (i.e. program code) 162, 164, and 166 that, when executed by processor 152, may at least partially implement some or all functionalities described herein in relation to FIG. 1.

In some examples, one or more gateway devices and/or APs in first VLAN 102 may each include a local Domain Name System-Internet Protocol address (DNS-IP) mapping for a domain name (e.g., xyz.com).

Figure 2:
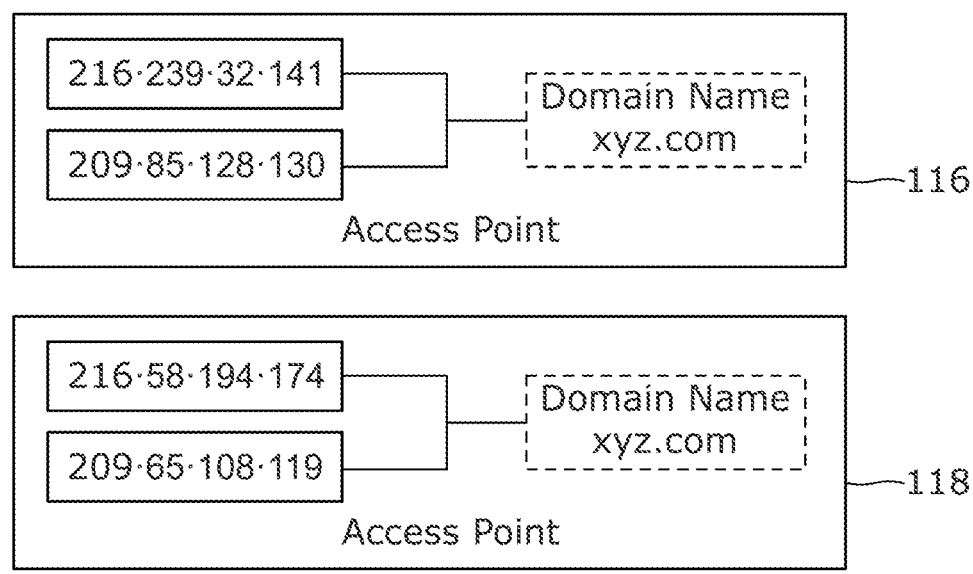
FIG. 2 illustrates example local DNS-IP mapping for a domain name in two access points.

A local DNS-IP mapping may comprise a list of IP addresses used for a domain name (e.g., xyz.com) by an AR For example, if AP 116 in first VLAN uses IP addresses 216.239.32.141 and 209.85.128.130 to access domain name "xyz.com", the local DNS-IP mapping for "xyz.com" in AP 116 may include these IP addresses. In another example, if AP 118 in first VLAN uses IP addresses 216.58.194.174 and 206.65.108.119 to access domain name "xyz.com", the local DNS-IP mapping for "xyz.com" in AP 118 may include the aforementioned IP addresses. Likewise, each AP in first VLAN may include a local DNS-IP mapping for one or more domain names (e.g., xyz.com, example2.com, example3.net, etc.). FIG. 2 illustrates an example local DNS-IP mapping 202 and 204 for APs 116 and 120, respectively.

In some example, instructions 162 may be executed by processor 152 to receive a local DNS-IP mapping for a domain name from respective APs in first VLAN 102 along with geographical information of respective APs.

In some examples, processor 152 may receive a local DNS-IP mapping for a domain name from respective APs by "pulling" the local DNS-IP mapping from respective APs. For example, via a gRPC Remote Procedure Call. gRPC is an Open Source inter-process communication protocol which is used for a remote procedure call. In some examples, a local DNS-IP mapping for a domain name may be "pushed" by respective APs to processor 152. For example, via a WebSocket channel. A WebSocket channel is a communication protocol that provides a bi-directional communication channel between a client and an end device (e.g., an AP). Processor 152 may receive a local DNS-IP mapping from an AP (e.g., 116) at a periodic interval (e.g., an hour, two hours, etc.), which may be pre-defined. Receiving local DNS-IP mapping periodically may reduce the number of updates to the cloud computing system and, consequently, reduce network load. In some examples, a local DNS-IP mapping for a domain name may be received from an AP only in an event of a change in the IP address used for accessing the domain name.

Processor 152 may also receive geographical information of respective APs along with their local DNS-IP mapping. The geographical information of an AP may include data related to its location. In some examples, the geographical information of an AP may include a site label that links the AP to a specific site. A network administrator may use a site label to mark all APs belonging to the same site. Different site labels may be used to mark APs at different sites. The geographical information of an AP may be received, for example, via a gRPC or a WebSocket channel.

Instructions 164 may be executed by processor 152 to generate a global DNS-IP mapping database 170 in cloud computing system 160. The global DNS-IP mapping database 170 may comprise the local DNS-IP mapping for the domain name received from respective APs in first VLAN 102 along with geographical information of respective APs. As mentioned earlier, processor 152 may receive a local DNS-IP mapping for a domain name (e.g., xyz.com) from respective APs in first VLAN 102 along with geographical information of respective APs. In some examples, such information may be recorded in global DNS-IP mapping database 170 on cloud computing system 160. The global DNS-IP mapping database 170 may record the local DNS-IP mapping for a domain name from respective APs along with geographical information of respective APs. When processor 152 receives a local DNS-IP mapping from an AP in first VLAN 102 along with AP's geographical information, it may create a record in the global DNS-IP mapping database 170 for the AR At a later point in time, processor 152 may receive an update related to the local DNS-IP mapping from the same AP. Upon receiving the update, processor 152 may update the record related to the AP in the global DNS-IP mapping database 170. In an example, the global DNS-IP mapping database 170 may be in a tabular form (e.g., a spreadsheet).

Upon generation of the global DNS-IP mapping database 170 in cloud computing system 160, instructions 166 may be executed by processor 152 to determine appropriate APs for distributing the global DNS-IP mapping for a domain name. Processor 152 may determine appropriate APs for distributing the global DNS-IP mapping for a domain name based on location information of respective APs. In some examples, the location information of respective APs may include geographical information of respective APs in the global DNS-IP mapping database 170. As mentioned earner, the global DNS-IP database 170 may include site label information for respective APs. A site label links an AP to a specific site. Instructions 166 may use the site label information for respective APs to determine appropriate APs for distributing the global DNS-IP mapping for a domain name. For example, instructions 166 may use the site label information to determine APs on a floor of a building as "appropriate" APs. In another example, instructions 166 may use the site label information to determine APs in a building as "appropriate" APs. In another example, instructions 166 may use the site label information to determine APs at a campus as "appropriate" APs. In a like manner, based on site label information, APs at a specific site may be determined as "appropriate" APs for distributing the global DNS-IP mapping for a domain name.

Figure 3:
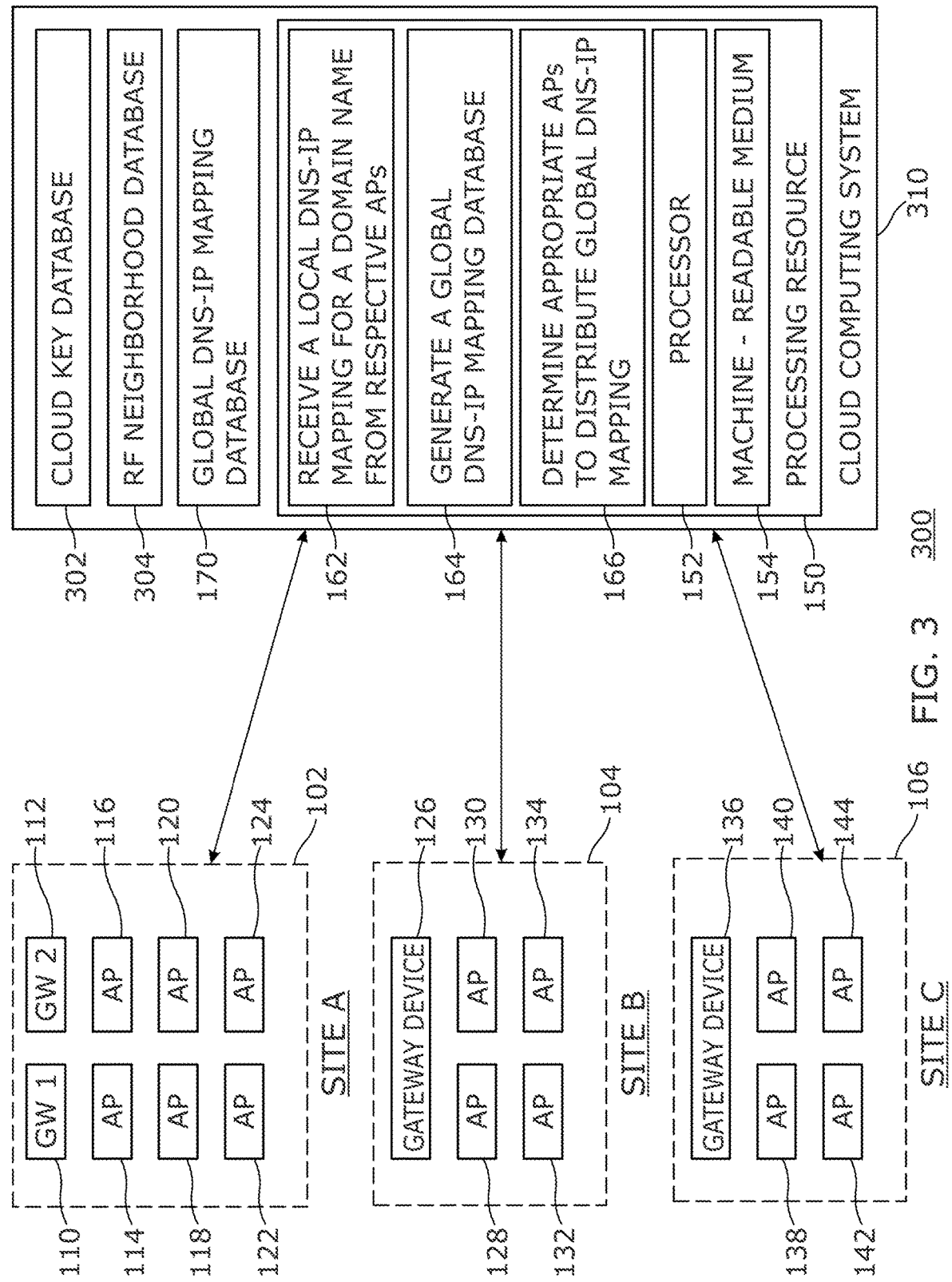
FIG. 3 is a block diagram of an example computing environment for controlling network traffic pertaining to a domain name based on a DNS-IP mapping.

In some examples, instructions 166 may determine appropriate APs for distributing the global DNS-IP mapping for a domain name based on Radio Frequency (RF) neighborhood information of respective APs in cloud computing system 160. As used herein, a "Radio Frequency (RF) neighborhood" includes a group of APs that belong to the same RF group that can physically hear one another's messages above a given signal threshold. In an example, APs in first VLAN 102 may be divided into several virtual RF neighborhoods, wherein APs in the same RF neighborhood share the same clients. RF neighborhood information of respective APs may be maintained in a RF neighborhood database on a cloud computing system. This is illustrated in FIG. 3, which depicts an example computing environment 300.

In an example, computing environment 300 may be analogous to computing environment 100 of FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 3. Said components or reference numerals may be considered alike.

In an example, cloud computing system 310 may include a cloud key database 302. The cloud key database 302 may include client information related to a client (not shown) that connects to an AP (e.g., 116) in first VLAN (e.g., 102). Examples of the client information may include current AP information, client VLAN, etc. Whenever a client first time connects to an AP (e.g., 116), a location update message may be sent to cloud computing system 310, which may setup a new client context in the cloud key database 302 with client information mentioned earlier. If a client performs IEEE 802.1X (dot1x) authentication, which is used to prevent unauthorized devices from gaining access to a network, the authentication key may be cached in the cloud key database 302.

In an example, instructions 166 may query RF neighborhood database 304 on cloud computing system 310 to get a list of neighboring APs and pre-install the client key to all neighboring APs. As mentioned earlier, a "Radio Frequency (RF) neighborhood" includes a group of APs that belong to the same RF group that can physically hear one another's messages above a given frequency threshold. In an example, APs (e.g., 112, 116, and 120) in first VLAN (e.g., 102) may be divided into several virtual RF neighborhoods, wherein APs in the same RF neighborhood share the same clients. RF neighborhood information of respective APs may be maintained in RF neighborhood database 304.

When a client roams, a new location update message may be sent to cloud computing system 310 with the new AP information, which updates the client context. Instructions 166 may determine whether there is an existing cached authentication key for the client. Upon such determination, processor (e.g., 154) may pre-install the authentication key to the new neighboring APs of the new AP. In this way, when a client roams to a new AP, it can perform a Fast Transition (FT) authentication, which results in fast roaming. An FT authentication is a roaming concept where the initial handshake with a new AP is done even before the client roams to the new AP.

Upon receiving the location update message, instructions 166 may determine the related domain names for the client by using the user role and its configuration, since the client context already has the user role (which, by way of an example, may include a string to identify the ACL) assigned for that client. In an example, this user role string may be used to retrieve the real configuration of the role. The domain names may be determined by looking into the definition of the user role. Once the domain name for this client is known, instructions 166 may perform a domain name look up to identify DNS-IP mappings related to the user role associated with the client.

In some examples, upon determination of appropriate APs for distributing the global DNS-IP mapping for a domain name, instructions 166 may be executed by processor 152 to distribute the global DNS-IP mapping to appropriate APs. Distribution of the global DNS-IP mapping to appropriate APs may enable the recipient APs to control network traffic related to a domain name. In some examples, a recipient AP may exercise control over a domain name by including the IP addresses received via the global DNS-IP mapping in an ACL. An access control list (ACL) is a list of permissions associated with a system object. An ACL specifies which users or system processes are granted permissions to access objects (for example, a domain name). Thus, a recipient AP may determine whether a client device is permitted to access a domain name or not.

In some examples, a recipient AP may exercise control over a domain name by including the IP addresses received via the global DNS-IP mapping in a PBR. A policy based routing (PBR) is mechanism used to make routing decisions based on policies set by a network administrator. For example, upon distribution of IP addresses (e.g., 216.58.194.174 and 206.65.108.119) mapped to a domain name (e.g., "xyz.com") in the global DNS-IP mapping, to APs in first VLAN, a recipient AP may include the aforementioned IP addresses in a PBR to control network traffic related to the domain name. The global DNS-IP mapping may allow recipient APs to control a client device initiated network traffic pertaining to the domain name. The recipient APs may be present in first VLAN 102, another VLAN (e.g., second VLAN 104), and/or at a given site.

Figure 4:
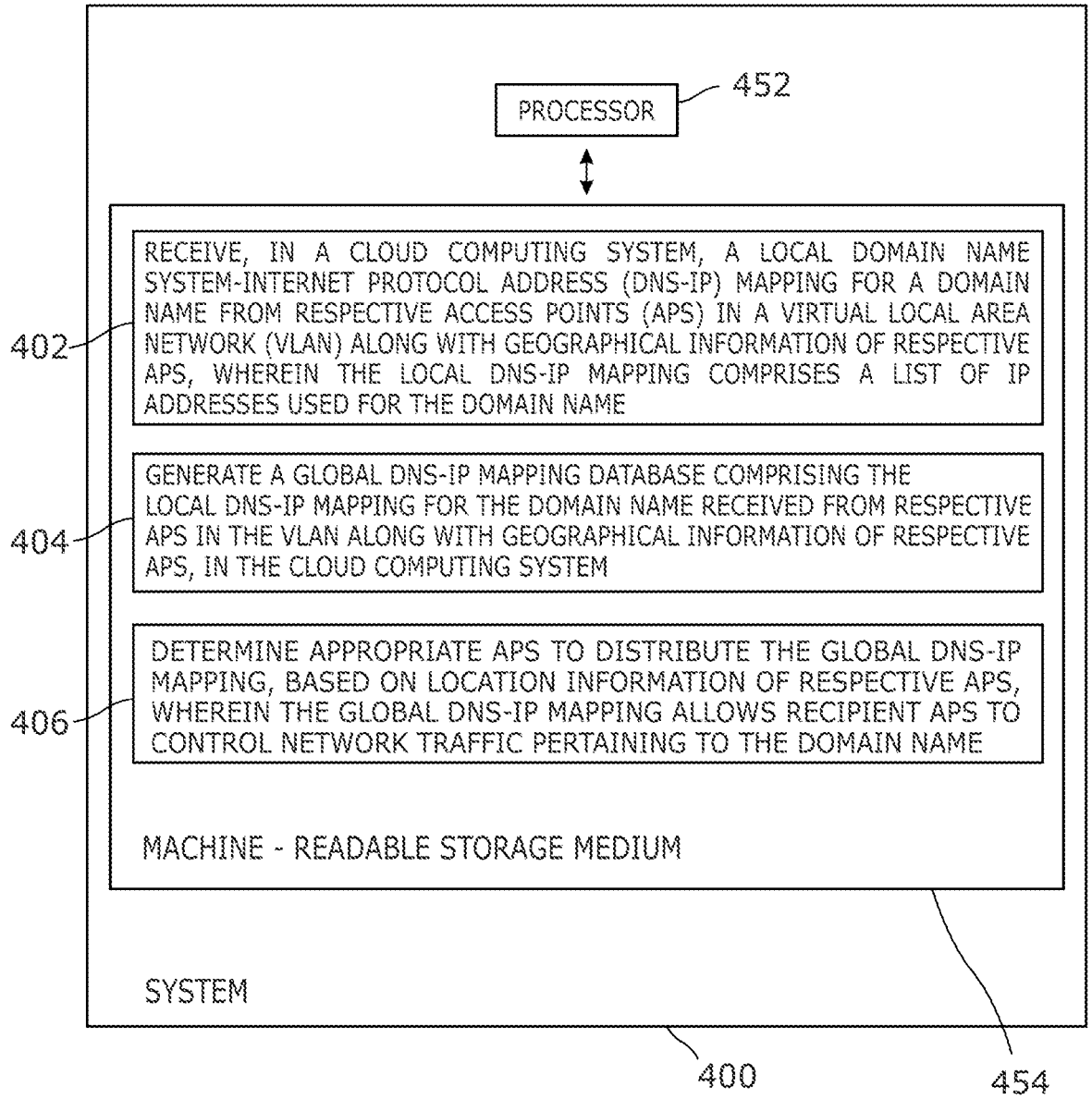
FIG. 4 is a block diagram of an example system for controlling network traffic pertaining to a domain name based on a DNS-IP mapping.

Referring now to FIG. 4, which is a block diagram of an example system 400 for controlling network traffic pertaining to a domain name based on a DNS-IP mapping. In an example, system 400 may be analogous to processing resource 150 of FIG. 1, in which like reference numerals correspond to the same or similar, though perhaps not identical, components. For the sake of brevity, components or reference numerals of FIG. 4 having a same or similarly described function in FIG. 1 are not being described in connection with FIG. 4. Said components or reference numerals may be considered alike.

As used herein, a "system" may include a server, a computing device, a network device (e.g., a network router), a virtualized device, a mobile phone, a tablet or any other processing device. A "system" may include software (machine-readable instructions), a dedicated hardware, or a combination thereof.

In an example, system 400 may include a processor 452 and a machine-readable storage medium 454 communicatively coupled through a system bus. Processor 452 may be any type of Central Processing Unit (CPU), microprocessor, or processing logic that interprets and executes machine-readable instructions stored in machine-readable storage medium 454.

Machine-readable storage medium 454 may be a random access memory (RAM) or another type of dynamic storage device that may store information and machine-readable instructions that may be executed by processor 452. For example, machine-readable storage medium 454 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 454 may be a non-transitory machine-readable medium.

In an example, machine-readable storage medium 454 may store machine-readable instructions (i.e. program code) 402, 404, and 406 that, when executed by processor 452, may at least partially implement some or all functionalities described herein in relation to FIG. 4.

In an example, instructions 402 may be executed by processor 452 of system 400 to receive a local DNS-IP mapping for a domain name from respective APs in a VLAN along with geographical information of respective APs. A local DNS-IP mapping may comprise a list of IP addresses used for the domain name.

Instructions 404 may be executed by processor 452 of system 400 to generate a global DNS-IP mapping database comprising the local DNS-IP mapping for the domain name received from respective APs in the VLAN along with geographical information of respective APs, in a cloud computing system.

Instructions 406 may be executed by processor 452 of system 400 to determine appropriate APs to distribute the global DNS-IP mapping, based on location information of respective APs. In an example, the global DNS-IP mapping may allow recipient APs to control network traffic pertaining to the domain name.

Figure 5:
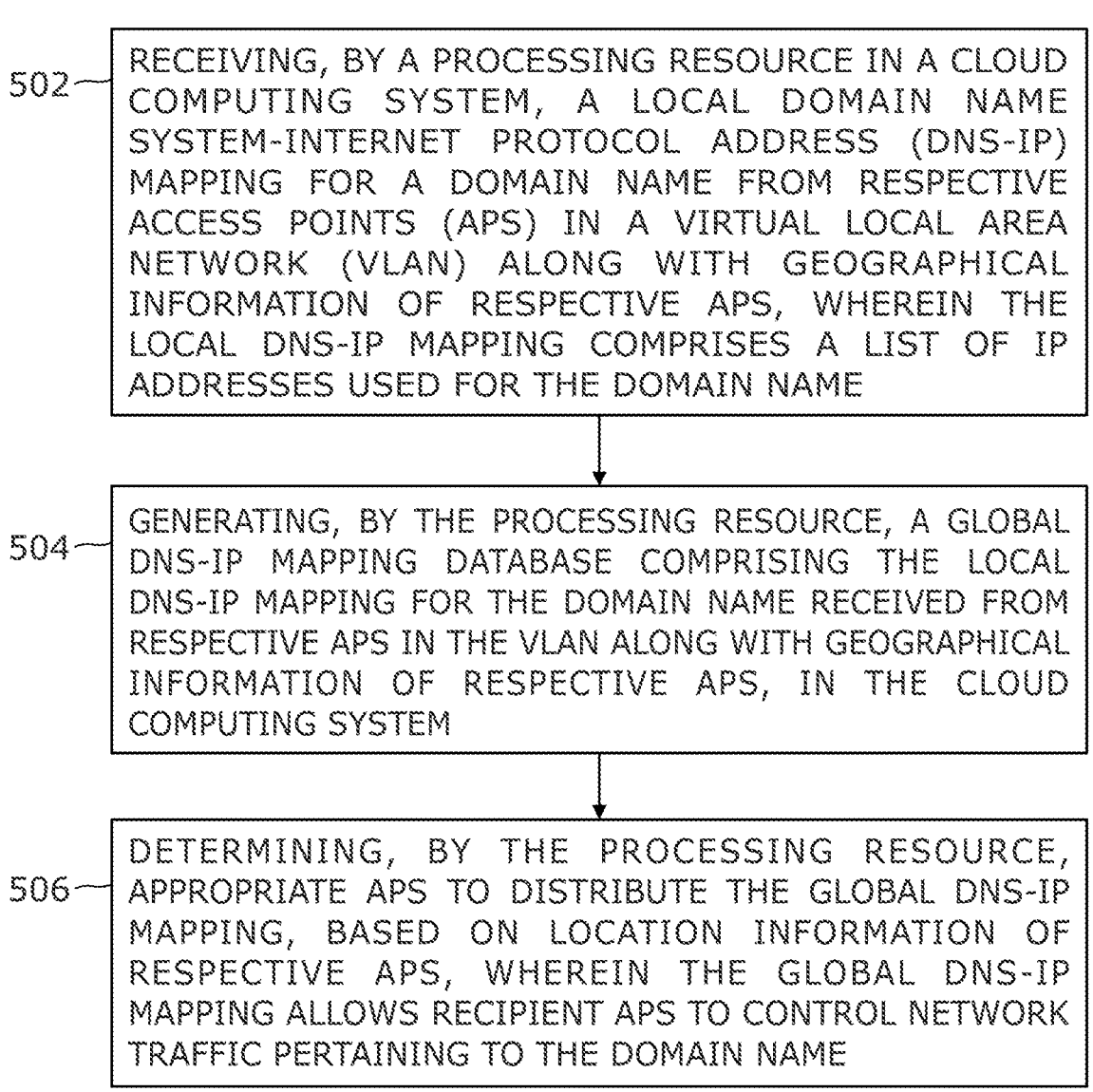
FIG. 5 is a block diagram of an example method of controlling network traffic pertaining to a domain name based on a DNS-IP mapping.

FIG. 5 is a flowchart of an example method 500 of controlling network traffic pertaining to a domain name based on a DNS-IP mapping. The method 500, which is described below, may at least partially be executed on processing resource 150 of FIG. 1. However, other processing devices may be used as well.

At block 502, processor 152 may execute instructions 162 to transmit messages to receive a local DNS-IP mapping for a domain name from respective APs in a VLAN along with geographical information of respective APs. A local DNS-IP mapping may comprise a list of IP addresses used for the domain name.

At block 504, processor 152 may execute instructions 164 to generate a global DNS-IP mapping database comprising the local DNS-IP mapping for the domain name received from respective APs in the VLAN along with geographical information of respective APs, in a cloud computing system.

At block 506, processor 152 may execute instructions 166 to determine appropriate APs to distribute the global DNS-IP mapping, based on location information of respective APs. In an example, the global DNS-IP mapping may allow recipient APs to control network traffic pertaining to the domain name.

Figure 6:
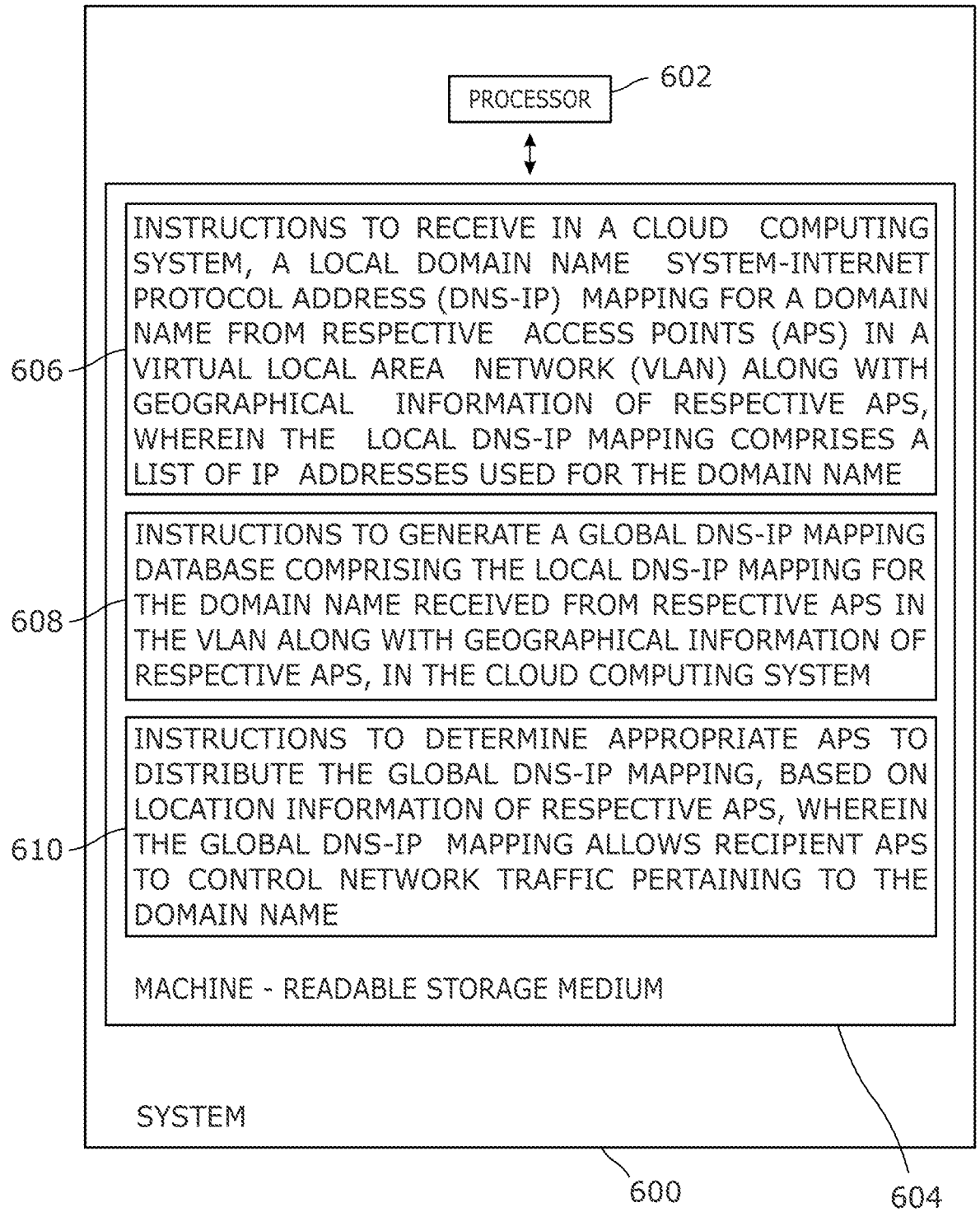
FIG. 6 is a block diagram of an example system including instructions in a machine-readable storage medium for controlling network traffic pertaining to a domain name based on a DNS-IP mapping.

FIG. 6 is a block diagram of an example system 600 for controlling network traffic pertaining to a domain name based on a DNS-IP mapping. System 600 includes a processor 602 and a machine-readable storage medium 604 communicatively coupled through a system bus. In an example, system 600 may be analogous to processing unit 150 of FIG. 1 or system 400 of FIG. 4. Processor 602 may be any type of Central Processing Unit (CPU), microprocessor, or processing logic that interprets and executes machine-readable instructions stored in machine-readable storage medium 604. Machine-readable storage medium 604 may be a random access memory (RAM) or another type of dynamic storage device that may store information and machine-readable instructions that may be executed by processor 602. In an example, machine-readable storage medium 604 may be a non-transitory machine-readable medium. Machine-readable storage medium 604 may store instructions 606, 608, and 610.

In an example, instructions 606 may be executed by processor 602 to transmit messages to receive a local DNS-IP mapping for a domain name from respective APs in a VLAN along with geographical information of respective APs. A local DNS-IP mapping may comprise a list of IP addresses used for the domain name.

Instructions 608 may be executed by processor 602 to generate a global DNS-IP mapping database comprising the local DNS-IP mapping for the domain name received from respective APs in the VLAN along with geographical information of respective APs, in a cloud computing system.

Instructions 610 may be executed by processor 602 to determine appropriate APs to distribute the global DNS-IP mapping, based on location information of respective APs. In an example, the global DNS-IP mapping may allow recipient APs to control network traffic pertaining to the domain name.

For the purpose of simplicity of explanation, the example method of FIG. 5 is shown as executing serially, however it is to be understood and appreciated that the present and other examples are not limited by the illustrated order. The example systems of FIGS. 1, 3, 4, and 6, and method of FIG. 5 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be understood that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
receiving, by a processing resource in a cloud computing system, a local Domain Name System-Internet Protocol address (DNS-IP) mapping for a domain name from respective Access Points (APs) in a virtual local area network (VLAN) along with geographical information of respective APs, wherein the local DNS-IP mapping comprises a list of IP addresses used for the domain name;
generating, by the processing resource, a global DNS-IP mapping database comprising the local DNS-IP mapping for the domain name received from respective APs in the VLAN along with geographical information of respective APs, in the cloud computing system; and
determining, by the processing resource, appropriate APs to distribute the global DNS-IP mapping, based on location information of respective APs, wherein the global DNS-IP mapping allows recipient APs to control network traffic pertaining to the domain name.

2. The method of claim 1, wherein the location information comprises the geographical information of respective APs in the global DNS-IP mapping database.

3. The method of claim 1, wherein the geographical information comprises a site label used to associate respective APs to a site.

4. The method of claim 1, wherein the location information comprises Radio Frequency (RF) neighborhood information of respective APs in the cloud computing system.

5. The method of claim 1, wherein the global DNS-IP mapping allows recipient APs to control network traffic pertaining to the domain name via an Access Control List (ACL).

6. The method of claim 1, wherein the global DNS-IP mapping allows recipient APs to control network traffic pertaining to the domain name via a Policy Based Routing (PBR).

7. The method of claim 1, wherein the global DNS-IP mapping allows recipient APs to control a client device initiated network traffic pertaining to the domain name.

8. The method of claim 1, wherein the local DNS-IP mapping for the domain name is received from an AP in an event of a change in an IP address for the domain name.

9. The method of claim 8, further comprising updating the global DNS-IP mapping database to reflect the change in the IP address for the domain name.

10. A system comprising:
a processor; and
a machine-readable medium storing instructions that, when executed by the processor, cause the processor to:
receive, in a cloud computing system, a local Domain Name System-Internet Protocol address (DNS-IP) mapping for a domain name from respective Access Points (APs) in a virtual local area network (VLAN) along with geographical information of respective APs, wherein the local DNS-IP mapping comprises a list of IP addresses used for the domain name;
generate a global DNS-IP mapping database comprising the local DNS-IP mapping for the domain name received from respective APs in the VLAN along with geographical information of respective APs, in the cloud computing system; and
determine appropriate APs to distribute the global DNS-IP mapping, based on location information of respective APs, wherein the global DNS-IP mapping allows recipient APs to control network traffic pertaining to the domain name.

11. The system of claim 10, wherein the local DNS-IP mapping for the domain name is received via a WebSocket channel.

12. The system of claim 10, wherein the local DNS-IP mapping for the domain name is received via a gRPC Remote Procedure Call.

13. The system of claim 10, wherein the local DNS-IP mapping for the domain name is received from respective APs periodically.

14. The system of claim 10, wherein the APs include at least one gateway device.

15. The system of claim 10, wherein the appropriate APs include APs at a site.

16. A non-transitory machine-readable storage medium comprising instructions, the instructions executable by a processor of a system to:
receive, in a cloud computing system, a local Domain Name System-Internet Protocol address (DNS-IP) mapping for a domain name from respective Access Points (APs) in a virtual local area network (VLAN) along with geographical information of respective APs, wherein the local DNS-IP mapping comprises a list of P addresses used for the domain name;
generate a global DNS-IP mapping database comprising the local DNS-IP mapping for the domain name received from respective APs in the VLAN along with geographical information of respective APs, in the cloud computing system; and determine appropriate APs to distribute the global DNS-IP mapping, based on location information of respective APs, wherein the global DNS-P mapping allows recipient APs to control network traffic pertaining to the domain name.

17. The storage medium of claim 16, wherein the appropriate APs include APs in the VLAN.

18. The storage medium of claim 16, wherein the appropriate APs include APs in another VLAN.

19. The storage medium of claim 16, further comprising instructions to distribute the global DNS-IP mapping for the domain name to one or more of: APs in the VLAN, APs in another VLAN, and APs at a given site.

20. The storage medium of claim 19, wherein the location information comprises one of the geographical information of respective APs in the global DNS-IP mapping database and Radio Frequency (RF) neighborhood information of respective APs in the cloud computing system.

* * * * *